Nov. 29, 1932.   H. B. PULLAR   1,889,697
PROCESS FOR PRODUCING ASPHALT
Filed June 10, 1929
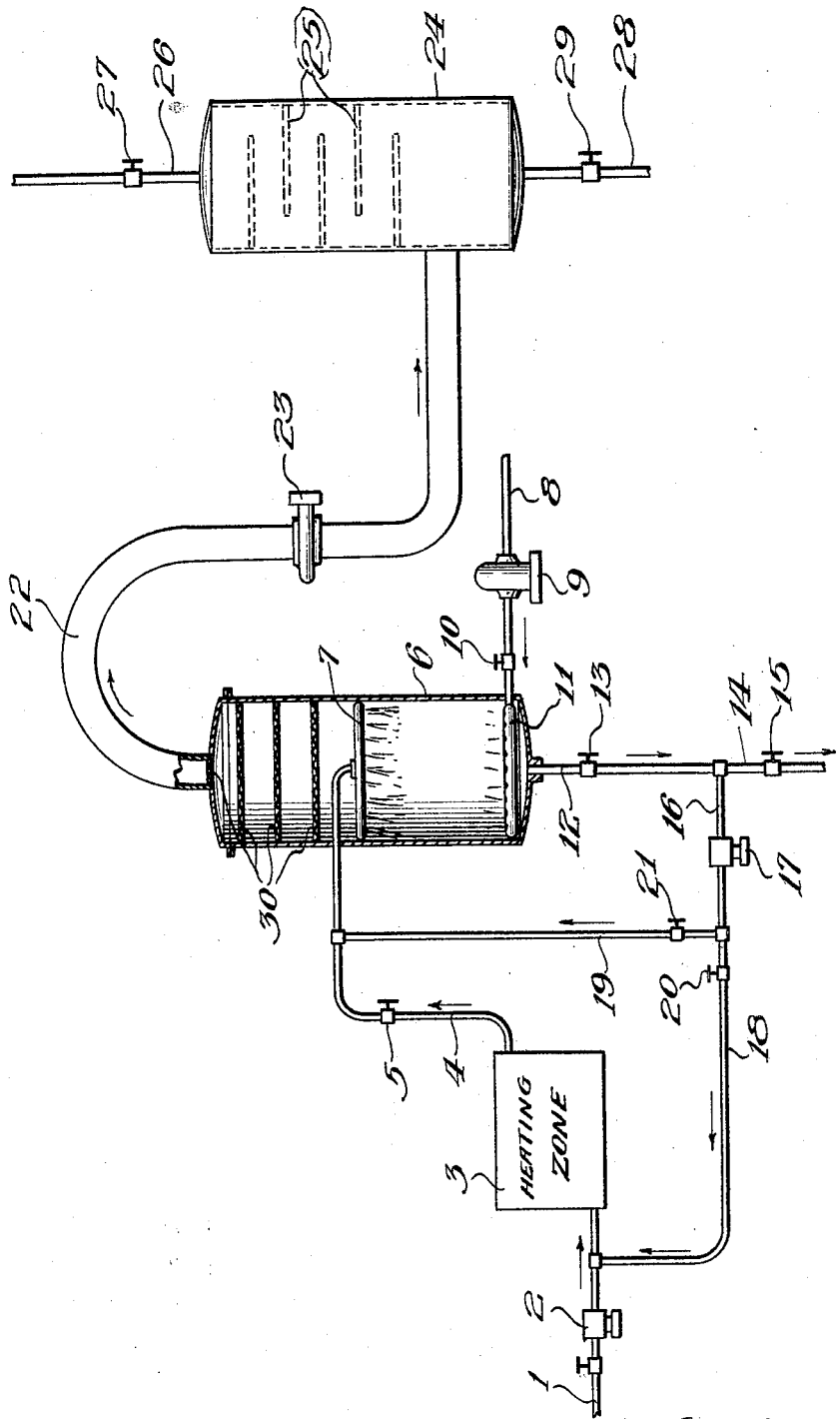
Witness:
Stephen F. Rebora
Inventor:
Harold B. Pullar
By Frank L. Belknap
Atty.

Patented Nov. 29, 1932

1,889,697

UNITED STATES PATENT OFFICE

HAROLD B. PULLAR, OF CHICAGO, ILLINOIS

PROCESS FOR PRODUCING ASPHALT

Application filed June 10, 1929. Serial No. 369,641.

This invention relates to a new and improved process in the art of producing what is commonly known and referred to as airblown or oxidized bituminous materials, and more particularly relates to a process for the manufacture of air-blown or oxidized bituminous materials, such as asphalt, continuously and economically.

Processes of treating residuum oils by blowing or oxidizing with air for the production of asphalt products suitable for various uses, such as road oil, waterproofing, insulation, et cetera, have been used for years. The present invention relates to a new and novel process for the manufacture of materials of this general group in a continuous manner, thereby considerably reducing the time, reducing the size and eliminating the equipment which was formerly necessary for this kind of work. The process of my invention enables the production of a more uniform material, giving more desirable properties to the finished product.

The usual process for oxidizing or blowing residuum oil for the production of asphalt was to subject rather large and definite quantities of oil to violent agitation by air, blown or sucked through the body of the oil at definite temperatures for a definite period of time required to change the oil from its liquid consistency to a solid or semi-solid compound having definite properties and characteristics. This process was entirely a batch process—after the large body of oil had been subjected to air agitation for the length of time deemed sufficient to convert the oil to the desired compound, the process was interrupted and the batch removed from the still. The still was then charged with a fresh batch of residuum oil and the process repeated.

According to the present invention, the residuum oil is preheated to its required temperature, after which it is reduced to a finely divided condition, for instance, by dividing it into a multiplicity of small spray-like streams, or in the form of a relatively thin film, at which time it is brought into intimate contact with a volume of air in an enlarged reaction chamber under definite temperature and pressure control to bring about a rapid reaction, causing the oil to change its characteristics from a liquid, or semi-liquid, to a solid, or semi-solid condition, varying in melting point from 75° F. to 400° F. and having certain definite properties and characteristics depending upon the temperature of the reaction and the character of the oil used in the process.

The utility of the invention as well as other objects and advantages thereof will be more apparent from the following description.

The single figure in the drawing is a diagrammatic side elevational view of a flow chart of the process.

Referring more in detail to the drawing, 1 designates a charging line for the residuum oil to be converted into asphalt. A conventional type of pump is interposed in the line 1, to draw the oil from a suitable storage or source of supply (not shown). Pump 2 charges the residuum oil through a heating zone 3 which is shown diagrammatically and which may comprise any suitable conventional heater, such, for instance, as a continuous coil, still or other suitable means whereby the oil is heated to a suitable temperature, which for the purposes of the present invention may range from 300 to 600° F., more or less, depending upon the flash point of the oil and its characteristics, different grades of oils requiring different temperatures at which the reaction with air most rapidly takes place. After the oil has been heated to the proper temperature in the heating zone 3 it passes, by means of transfer line 4, in which may be interposed a valve 5, into an enlarged reaction chamber 6. The reaction chamber 6 may take the form of an enlarged metal shell either horizontally or vertically disposed. The reaction chamber 6 will have a capacity sufficient to take care of the desired volume of oil to be treated, the proper size is within the purview of those skilled in this art.

As a feature of the present invention, the heated oil discharging from the line 4 is broken up or reduced to finely divided condition, for instance, by having to pass through the spray 7, attached to the end of the line 4. While I have illustrated a spray 7 as one means of reducing the heated oil to finely divided condition, it is to be understood that I do not wish to be limited to this means, nor to the reduction in the form of a spray, the intention being that the heated residuum oil at the time of introduction to the interior of the chamber 6 will be reduced to finely divided condition either in the form of a multiplicity of fine streams or in the form of relatively thin film, the purpose being to reduce the heated oil to such a condition that the air will easily and readily react therewith.

Air, preheated or not, as desired, may be introduced through the pipe 8 by the medium of the blower or air compressor 9 and through valve 10 into the lower interior of the reaction chamber 6. Pipe 8 preferably terminates in a perforated pipe, or pipes, 11 so as to diffuse the air and distribute it equally at the same pressure throughout the chamber. One or more of these perforated pipes 11 may be used, depending upon the size of the chamber and the capacity of the installation. I desire to introduce the air in such a manner as to uniformly diffuse it throughout the chamber, and while I have shown a perforated pipe 11, any means may be employed which will distribute the air equally with equal pressure throughout the chamber.

Reaction will take place within the chamber 6 between the finely divided streams of air and the finely divided particles of heated residuum oil, the air tending to ascend, and the oil tending to descend. The reaction between the finely divided air streams and the finely divided oil particles converts the latter into the desired product of the invention.

The liquid reaction product may be withdrawn from chamber 6 through the draw-off line 12, controlled by valve 13, and may be diverted to storage through the line 14, by obvious manipulation of the valve 15. Provision is made for diverting regulated portions of the liquid end product removed through line 12 through the line 16, in which is interposed a pump 17. Line 16 terminates in branch lines 18 and 19, controlled, respectively, by valves 20 and 21, branch 18 communicating with the charging line 1 while branch 19 communicates with the transfer line 4 for purposes to be hereinafter described.

The fumes generated in the chamber 6 by the reaction, together with the air and any volatile fractions ascend through said chamber 6, passing out through the draw-off line 22, in which is interposed a suction fan or pump 23, the line 22 discharging into the lower portion of a baffled tank condenser or cooler 24 provided with baffles 25, upper draw-off 26, controlled by valve 27, and lower draw-off 28, controlled by valve 29.

If desired I may mount mechanical separators 30 in the upper portion of the chamber 6 to strip any liquid which may be mechanically entrained with the gaseous material ascending through the chamber 6. The lower element 30 may comprise a perforated plate having fairly large perforations, while the element just above it may also be a perforated plate having smaller perforations. Above these perforated plates the elements 30 may take the form of screens of progressively smaller mesh.

Air pressure in pipe 8 depends to some extent upon the pressure of the oil discharging through the element 7. The best working pressure of air for this purpose is from two to five pounds, more or less. The volume of air is dependent upon the size of the installation, the amount of oil to be treated and the length of time it is desired to treat the oil.

Since the fumes, air and light distillates of reaction should be conveyed from the reaction chamber as rapidly as produced, a slight suction may be required on the pipe 22. For this purpose a suction pump or fan 23 is provided.

The air compressor or blower 9 is of such size and capacity as to supply sufficient air through pipe 8 into the reaction chamber so as to cause rapid conversion of the oil.

Having described in the simplest manner apparatus required for the process of this invention, the method of procedure is as follows:

A residuum oil or similar bituminous material having certain inherent properties and characteristics that enable it to change its characteristics when brought into intimate contact with air under definite temperatures and conditions is passed through line 1 by means of pump 2 and heated in heating zone 3 to the proper temperature, which as before pointed out, may vary from 300 to 600° F., more or less, depending on the type of oil treated. The heated oil passes through transfer line 4, discharging in the form of finely divided particles in the reaction chamber 6 where it is brought into intimate contact with the finely divided streams of air being introduced through the pipe 8 by means of the blower 9. A quick and definite reaction takes place in this chamber between the time the oil is discharged from the element 7 and the time it drops to the outlet 12.

As a feature of the present invention, depending upon the quality of product desired, the material as it comes into outlet 12 may or may not be a finished product as a result of one reaction in the chamber. For instance, if a high melting point product is desired then a portion or all of the material passing into discharge 12 is diverted into line 16 by closing valve 15 into either or both of the branches 18 and 19, eventually to be returned to the interior of the chamber 6. In this manner it may be resubjected to the action of the air until it has a desired melting point consistency and other required properties.

In one method of operation, a definite amount of oil may be subjected to reaction in the manner described and recirculated a sufficient number of times to produce an asphalt product having the desired melting point and other characteristics, after which the process can be continued by bleeding in a sufficient volume of fresh residuum oil to be treated to compensate for the asphalt being removed through line 14. In other words, after the initial period of recirculation to convert the original oil into a product of the desired characteristics, a sufficient volume of new oil is permitted to flow into the reaction chamber to give a uniform product, which latter will continually flow from the outlet 14.

The following is an illustrative example of an operation carried out according to the present invention. A residuum oil produced in the distillation of a California crude, which oil may have a gravity of approximately 10° Bé. and a flash point of approximately 450° F., may be heated in the heating zone 3 to a temperature of 425° F., after which it is broken up into finely divided particles and discharged into the interior of the chamber 6. There the finely divided particles of heated oil are brought into contact with finely divided streams of air introduced at atmospheric temperature under a pressure of approximately four pounds. The volume of air utilized will, of course, depend upon the characteristics desired in the resulting product. For instance, for a road asphalt of about 85 to 100 penetration, blowing may take place for approximately one hour at a rate of about 150 cubic feet of air per minute per ton of heated liquid oil discharging into chamber 6; for a paving cement of about 40 to 50 penetration, approximately 4 to 6 hours; for an asphalt suitable for roofing purposes of about 15 to 25 penetration, approximately 6 to 10 hours, and an asphalt of about 3 to 6 penetration, approximately 12 to 15 hours. The rate of flow of oil into the system, of course, will depend upon the character of the oil, the character of the desired resultant asphalt and the size of the chamber 6. Pressure on the oil passing through pipes 1 and 4 and heating zone 3 is just sufficient to overcome friction and is preferably maintained at about four pounds. Thus, the two forces of downwardly descending liquid and upwardly ascending air being at approximately the same pressure will tend to prolong the time during which they are in contact, which is desirable to bring about the reaction.

The air, fumes and light volatiles are removed through the line 22 while the desired reaction product is removed through line 12. In this initial reaction, the melting point of the product being removed through line 12 will have been raised approximately 25° F., that is, it will have a melting point of approximately 100° F. This type of asphalt product is eminently suitable for use for the treatment of certain types of roads. If it is desired to raise the melting point above 100° F., valve 15 is either totally or partially closed and the liquid recycled through the lines 18 or 19, or both, as previously described. This recycling is continued until the product passing through the line 12 is at the desired melting point, to be determined by any conventional test. It may be pointed out that in the recycling the increase in melting point seems to become proportionately less each time.

When the material being withdrawn through line 12 has the desired melting point, fresh residuum oil is fed through line 1 in a quantity to make up for the final product being withdrawn through line 14. From that point on the process will operate continuously and economically.

It is to be understood, of course, that the description in the foregoing illustration is merely illustrative. The process contemplates the treatment of any type of raw material which can be converted into the desired type of air-blown or oxidized material, and the extent of the reaction taking place depends on the character of the charging stock, temperature and the volume of air.

I claim as my invention:

1. A continuous process for blowing or oxidizing residuum oil for the production of asphalt therefrom, which comprises heating a continuously moving body of oil and reducing it to finely divided condition, then bringing it into intimate contact with a plurality of finely divided streams of air introduced under relatively low pressure in an enlarged reaction zone to cause a reaction between the particles of the oil and the streams of air, separately removing the resultant volatile matter and the desired reaction product and controlling the volume and pressure of the introduced air relative to the pressure of the oil so that said pressures are substantially equalized.

2. The process as defined in claim 1 further characterized in that a portion of said desired reaction product is recycled from and to the reaction zone.

In testimony whereof I affix my signature.

HAROLD B. PULLAR.